United States Patent Office 2,813,795
Patented Nov. 19, 1957

2,813,795
PROCESS OF TREATING CACAO SEEDS

William J. Hale, Midland, Mich., assignor to Verdurin Company, Detroit, Mich., a corporation of Michigan No Drawing. Application March 6, 1953,
Serial No. 340,925

16 Claims. (Cl. 99—23)

The present invention relates to a process of treating cacao seeds and to securing a roasted product of improved quality.

Basically, the concept involves the roasting of cacao seeds in the presence of, or contact with, a non-toxic porphyrin type of compound capable of releasing and in turn, absorbing oxygen from the air and thereby affording a continuously operating oxidative action upon certain more or less undesirable components of the cacao seed whereby enhancement of the seed in quality is accomplished.

The reversible play in oxidation and reduction as exhibited by chlorophyll-a and chlorophyll-b was briefly set forth in U. S. Patent 2,607,689 to William J. Hale, issued August 19, 1952, wherein the application of this reaction to enhancement of coffee beans during the roasting process was clearly described. It is now found that a clearly similar set of reactions may be brought into play when cacao seeds are roasted with chlorophyll or its derivatives.

In general, the seeds of *Theobroma cacao* (of the order of Sterculiacae) are known chiefly in two varieties: Criollo and Forastero; the seed of the former is a pale brown, the seed of the latter a purple hue. These medium-sized perennial evergreen trees are indigenous to South America and the West Coast of Africa. They are best grown in shade and yield cacao pods ripening throughout the year.

Cacao seeds have long been known to yield a material on roasting that is capable of being taken up in water to give a pleasant tasting and highly flavorable beverage, as well also as a highly prized confection and food. However, among the components within the finished product there lurk several ingredients that, in many individuals, do not lend themselves to disposal in human metabolism without considerable accompanying discomfiture. To such extent does this characteristic prevail that the affected individuals regard themselves as allergic to cocoa and chocolate—the chief commercial and marketable output of the commonly named "cocoa bean."

In preparing cocoa and chocolate for commerce, the cacao pods, carrying the seeds, are first subjected to fermentation, whereby splitting and dehusking during a 3 to 8 day period liberates the seeds. Following this initial step, the temperature is raised to 45–50° C. to kill the seed germ; permit the diastase present to saccharify much of the starch; liberate cacao pigment; open the way for the alkaloid theobromine to diffuse throughout the seed; and encourage the oxidase enzymes present to split up complex tannins so as to rid the seeds of astringent agents. A sufficient quantity of air is ever required here to assist in oxidation of the tannins. Following this step, the beans are air-dried to about 8 percent water content in order that storage is permissable without fear of mold.

An analysis of the dried fermented cacao beans indicates the kernel or nib amounts to about 88.5 percent of bean, with 10.8 percent as shell. Of the nib, 54.7 percent is fat; 1.42 percent is theobromine; 0.07 percent is caffeine; 12.2 percent is of other nitrogen substance; 17.4 percent is carbohydrate, 6.9 percent is tannin and 2.7 percent of ash with remainder water.

The determinative factor in preparing cacao seeds for the food industries centers upon the care and control of the roasting process, by which means the shell is dried and rendered more easily removable and certain disagreeable volatile substances are driven off, thus to enhance the residual flavor within the nib. When the chocolate is the product sought, a lower heat of some 95–110° C. is applied over several hours; when cocoa is the end desired, a higher roast of 110° to 120° C., not to exceed 150° C., is found more likely to disrupt fatty material and make subsequent removal of same more effective. After roasting process, cold air is blown in to speed up cooling followed by immediate dehusking to avoid loss of aroma. Melanguering with sugar to a paste suffices admirably to conserve the aroma. Roasting the beans initally only to a slight extent, then followed by addition of alkali carbonates (in what is termed "dutching" to darken end product) may likewise be followed by further roasting to desired point. This alkali solution, however, may be sprayed on the beans (1) prior to roasting, (2) part way in roasting, and (3) at end of roasting—the name for each procedure being termed "bean dutching," "nib dutching," and "liquor dutching" respectively. The prime object of the alkali is in neutralizing natural acidity and securing a milder flavor of end product. The roasted shell, when present with the nibs, imparts an undesirable off-odor to the cocoa mass.

An analysis of the roasted cacao nibs indicates the presence of some 2.7 percent moisture; 50.12 percent fats; 1.04 percent theobromine; 0.04 percent caffein; 12.12 percent other nitrogen substances; 8.07 percent starch; 19.57 percent other carbohydrates; 2.64 percent fiber; and 3.66 percent ash.

Cacao nibs are next milled to an extremely fine colloidal or semi-colloidal state (0.0008 inch) and led into a hydraulic press whereby cocoa butter is expressed and removed. The cocoa cake that remains carries from 8 to 15 percent cocoa-butter; hence, the commercial use of this cocoa-cake in beverages and certain foods where fats would materially interfere with homogeneous composition. Where chocolate is the end in view, a fine dispersion of cacao powder and sugar is ground up with cocoa butter. Introduction here of water increases the viscosity of chocolate, breaking continuity of fat-solid phases. Introduction of lecithin in smallest amount reduces viscosity. Lecithin is a noted phospholipid. Though "natural" cocoas are used, there is a growing demand for "dutched" cocoas, affording a darkened medium that finds chief use in soft drinks.

It is clearly discernible that the riddance from cacao beans of some of the undesirable components of nitrogenous composition, beyond that of theobromine and caffeine, may spring from reactions akin to those involved in the enhancement of coffee, as set forth in the patent cited above, and which likewise were without effect upon the caffeine present in coffee to a similar content of one percent. The presence in cacao beans of some 12 percent of nitrogenous substances other than theobromine nitrogen affords abundant opportunity here to study the effect of oxygen-supplying porphyrins, among which, notably, the simple magnesium chlorophyllin proved most effective.

The postulate proved ready of accomplishment. Not alone were we successful in improving the quality of cacao beans in the matter of riddance of much of the undesirable nitrogenous material; we discovered further that the oxidants employed simultaneously effected some degree of oxidation among the unsaturated aliphatic groups associated with glycerol in make up of fatty portion of cacao bean. This latter result is to no inconsiderable extent confirmed by prior studies with chlorophyll when introduced into the alimentary canal. For example, those individuals known to be seriously discomfited gastronomically by a mere sample of tomato expressed astonishment that by use of a few tablets carrying several milligrams of chlorophyll, they were able to eat tomatoes to any extent they wished. Chemically, this is clearly explainable on the recognition of the presence of lycopene in tomato, which lycopene, as a highly unsaturated carbon chain, responds immediately to the mild oxidation effect of chlorophyll and hence the removal from metabolic disturbances. Thus, by use of chlorophyll, one who, heretofore, has thought himself allergic to tomatoes, may throw off such allergy at will.

Cocoa butter carries 38.1 percent oleic and 1.5 percent linoleic glycerides (unsaturated); as well as 24.4 percent palmitic and 35.4 percent stearic glycerides (saturated). Of the unsaturated glycerides, 77 percent is mono-oleo; 16 percent is di-oleo; and 4 percent is tri-oleo glyceride; hence, the opportunity for the mild oxidant to exert its force could not be better chosen than among the fats of the cacao bean.

As may be expected, cacao beans following the fermentation step, carry scarcely a trace of chlorophyll. Therefore, the prime object of this invention concerns itself with introduction of chlorophyll, in any one of its forms, into the cacao beans and at that stage most conducive in promoting mild oxidation. This stage reveals itself to be just ahead of the roasting of bean and embraces a period of several hours or more; a period abundantly sufficient for effectually inducing oxidation reactions within the bean.

Preferably, the water-soluble sodium potassium magnesium chlorophyllin in aqueous solution displays greatest penetrability of both shell and nib. Upon treatment of beans with about 1/20 of 1% their weight of this chlorophyllin in a 1/10 of 1% solution, there ensues ready absorption of the chlorophyllin especially within the shell, which shell immediately turns black. Such porphyrin derivatives as iron or copper chlorin-e in aqueous solution likewise shows great penetrability but, thereafter, the roasted bean carries a slightly metallic taste especially where the copper chlorin-e compound is employed. Furthermore, if said copper residues reach the stomach they are certain to contribute to irritation of the optic nerve and to irritation of linings of kidneys and liver.

In the preferred manner, a small amount of wetting agent is added to the chlorophyllin solution just before application to the beans. Among such wetting agents are to be found monatomic, diatomic, and triatomic alcohols and particularly sulfonated higher alcohols and acids, as is the well known sulfochloraurate, $(CH_3.(CH_2)_{10}.CO.O.CH_2.CH_2.NH.CO.CH_2.SO_2.O.K)$ (A lauric acid ester of the potassium salt of sulfoacetic acid amidified with amino ethyl alcohol.)

*Example I*

To 5 pounds (2250 grams) of Accra cacao beans (a variety of the purple Forastero from West Africa) was added a solution of 2.25 grams 45% sodium potassium chlorophyllin of magnesium complex dissolved in 500 cc. water at room temperatures and the whole thoroughly stirred for an hour or more; after which the thoroughly wetted beans were allowed to dry on the floor of a darkened room with intermittent stirring and for a period of a day or more. The dried beans were then roasted in the usual manner (at 110° C. for 2 hours). Analysis of the final cacao nibs (freed from shells) indicated no change in content of the theobromine and caffeine but a drop in other nitrogen substances to as much as 22% below the amount originally present. There was also recorded a decrease in iodine number of fats present by 24% under the original.

*Example II*

Example I was repeated save here an equivalent quantity of sodium potassium chlorin-e of iron complex (1.5 grams of 90% product) was made to replace the chlorophyllin. Results were almost identical with those of Example I save the beverage obtained carried a slightly metallic taste.

*Example III*

Example I was repeated save here an equivalent quantity of haemoglobin (2.5 grams) was substituted for the chlorophyllin. The results fell a little short (15%) of those recorded in Example I. Nevertheless, there is proof that the haeme type of porphyrin does actually serve as reversible oxidizing agent.

*Example IV*

Example I was repeated save here an equivalent quantity of a pheophorbide (2 grams), or chlorophyllin rid of its magnesium complex, was employed. Again, the results were closely comparable with the results of Example I.

*Example V*

Example I was repeated save here there was employed an equivalent quantity of oil soluble chlorophyll carrying the phytyl group (4 grams) and brought into partial solution by use of acetone. Penetration was poor and consequently the results showed scarcely half as much oxidation as reported in Example I.

*Example VI*

Example I was repeated but a wetting agent (1 gram of sulfochloraurate) was added to the sodium potassium chlorophyllin of magnesium complex. Greater penetration of the bean was clearly discernible. Final analysis of the nibs, with no apparent change in percentage of theobromine and caffeine, showed a drop of 33 percent below the original content of other nitrogen substances, and a decrease in the iodine number of the fats present by practically 36 percent.

*Example VII*

Five pounds of air-dried cacao beans were now treated with 100 cc. of the 500 cc. of solution made up as in Example I and, after drying was submitted to gentle roasting for one-half hour at 95–100° C. Cooled quickly, the darkened beans with cracked shells were then treated with the remaining 400 cc. of solution of magnesium chlorophyllin as left from the earlier treatment to effect higher penetration through cracks in shells. The beans were again submitted to roasting for several hours at 110° C. At the end of operation, an analysis still showed no appreciable change in percentage of theobromine and caffeine but with other nitrogen substances, there was recorded a drop of 62% below the original amount and a total vanishing of unsaturation in the fats.

*Example VIII*

Example VII was repeated with employment of only half as much (1.1 gram) of 45% sodium potassium chlorophyllin of magnesium complex (calculating to 1/40% of 1% based on chlorophyllin). There was now added a small quantity (4% its weight on 100% basis) (0.2 gram) of carotenes and the material dissolved in 500 cc. of distilled water as before. The presence of carotene not only activates but stabilizes chlorophyllin thereby extending the oxidative action over a longer time and, of course, rendering unnecessary as much chlorophyllin as heretofore had been used. Analysis of results indicated a drop of over 75% below original content of other nitrogen substances and no unsaturated fats whatsoever.

Naturally, three or four stages in the roasting operation will still further contribute to deeper penetration of bean and to greater elimination of nitrogen substances, but by the third stage, there was already noticeable a drop in content of theobromine itself; a not altogether desirable status, if the cocoa is to serve its accustomed purpose as mild stimulant.

It is further to be recorded that the application of chlorophyll as oxidant for cacao beans need not be confined solely to the roasting steps, but may parallel closely the accepted procedures for application of alkali in the "dutching" process for production of improved chocolate and cocoa. Thus, the chlorophyll solution may be applied to the beans (1) prior to roasting; (2) at some partway stage in roasting; (3) at end of roasting, i. e., in the liquor stage; or at all stages together.

In general, the employment of such cocoa or chocolate products arising out of any one of the procedures above displayed no unpleasant or disturbing factors in digestion as reported by a score of individuals selected at random and who considered themselves allergic to chocolate.

Furthermore, the use of lecithin in stabilizing chocolate is in no way disturbed by the presence of residual matter left after employment of chlorophyllin in its oxidation reactions. In fact, lecithin all the better enhances the choicest of aromas in cocoa and chocolate that has been treated with mild oxidative agents as the chelated compounds carrying metal complexes, and among which chlorophyll is by far the most effective. Furthermore, no part of chlorophyll displays the slightest toxic action and in process is totally destroyed. Insoluble derivatives of chlorophyll are, of course, here serviceable if they can be introduced into texture of beans—a procedure more or less attainable by use of various solvents.

I claim:

1. A method of improving cocoa, chocolate and cocoa-butter which comprises impregnating dried cacao seeds with a solution of non-toxic oxygen-carrying porphyrin in an amount between about $\frac{1}{50}\%$ and 2% by weight of the seed and roasting the seeds at temperatures not to exceed approximately 200° C. for a period of time sufficient to destroy a substantial portion of nitrogen substances other than the naturally occurring theobromine and markedly reduce the degree of unsaturation of the contained fats.

2. A method of enhancing the beverage quality of cocoa and chocolate which comprises incorporating within unroasted cacao seed between about $\frac{1}{50}$ of 1% and 2% a solubilized non-toxic oxygen carrying porphyrin by weight of the cacao seed aerating the impregnated seed and then roasting same.

3. A method of improving cocoa, chocolate and cocoa-butter which comprises impregnating dried cacao seeds with a solution of chlorophyllin aerating the impregnated seed to induce mild oxidation and roasting the seeds at a temperature not in excess of approximately 200° C. for a period of time sufficient to destroy a substantial portion of nitrogenous substances other than the naturally occurring theobromine and to hydrogenate a substantial portion of unsaturated fatty components of the seed.

4. A method of improving cocoa, chocolate and cocoa-butter which comprises impregnating dried cacao seeds with a solution of chlorophyllin containing between about $\frac{1}{50}$ of 1% and 2% of chlorophyllin by weight of the seed and roasting the seeds at a temperature not in excess of approximately 200° C. for a period of time sufficient to destroy a substantial portion of nitrogenous substances other than the naturally occurring theobromine and markedly reduce the degree of unsaturation of the contained fats.

5. The product produced by the method of claim 2.

6. The product produced by the method of claim 3.

7. A method of enhancing the beverage quality of cocoa and chocolate which comprises incorporating within unroasted cacao seed a solubilized non-toxic porphyrin to no more than to approximately $\frac{1}{10}$ of 1% and 2% by weight of the cacao seed and then roasting the treated seed.

8. A method of enhancing the beverage quality of cocoa and chocolate which comprises incorporating within unroasted cacao seeds a solubilized non-toxic porphyrin together with a wetting agent, the amount of the porphyrin being $\frac{1}{50}$ of 1% to approximately 2% by weight of the cacao seed and roasting the treated seed.

9. A method of enhancing the beverage quality of cocoa and chocolate which comprises partially roasting cacao beans, cooling the partially roasted beans, incorporating in the partially roasted beans a non-toxic oxygen-carrying porphyrin in an amount between about $\frac{1}{50}\%$ and 2% by weight of the seed and continuing the roasting at a temperature not in excess of 200° C. for a period of time sufficient to reduce the content of nitrogenous substances other than the naturally occurring theobromine.

10. A method in accordance with claim 9 in which the said porphyrin is chlorophyll.

11. A method in accordance with claim 9 in which the said porphyrin is chlorophyllin.

12. A method of producing cocoa-butter characterized by low content of unsaturated triglycerides which comprises incorporating a non-toxic oxygen-carrying porphyrin in an amount between about $\frac{1}{50}\%$ and 2% by weight of the seed in unroasted cacao beans, roasting the beans for a period of several hours at a temperature of from about 110° C. to 150° C., milling the roasted beans and expressing the cocoa-butter from the milled product.

13. A cocoa-butter product produced by the method of claim 12.

14. A method of processing food products which contain a substantial amount of oleaginous material embodying a considerable proportion of unsaturated triglycerides to materially reduce the degree of unsaturation of such oleaginous material which comprises incorporating a solubilized chlorophyll in an amount of between $\frac{1}{50}\%$ and 2% by weight of the said products in such food product and heating the product at a temperature and for a period of time sufficient to markedly reduce the degree of unsaturation of the oleaginous content.

15. A method of treating food products containing lycopene to effect substantial oxidation of such lycopene which comprises contacting such food product at elevated temperatures with solubilized chlorophyll in an amount of between $\frac{1}{50}\%$ and 2% by weight of the said products.

16. A method in accordance with claim 4 in which a quantity of carotene is contained in the solution of chlorophyllin.

References Cited in the file of this patent
UNITED STATES PATENTS
2,607,689    Hale _____ Aug. 19, 1952